United States Patent [19]

Dagard et al.

[11] Patent Number: 4,765,946
[45] Date of Patent: Aug. 23, 1988

[54] INTRINSICALLY SAFE EMERGENCY COOLING DEVICE FOR A PRESSURIZED-WATER NUCLEAR REACTOR

[75] Inventors: Philippe Dagard, Marly Le Roi; Michel Couturier, Le Vesinet, both of France

[73] Assignee: Framatome, Courbevoie, France

[21] Appl. No.: 880,261

[22] Filed: Jun. 30, 1986

[30] Foreign Application Priority Data

Jul. 1, 1985 [FR] France ............................... 85 10023

[51] Int. Cl.⁴ ............................................ G21C 15/18
[52] U.S. Cl. ..................................... 376/282; 165/40; 376/298; 376/299
[58] Field of Search ................. 165/40; 376/282, 298, 376/299

[56] References Cited

U.S. PATENT DOCUMENTS

| | | |
|---|---|---|
| 3,047,485 | 7/1962 | Ellis . |
| 3,190,808 | 6/1965 | Dodd ................... 376/298 |
| 3,240,675 | 3/1966 | Weber ................... 165/40 |
| 3,255,084 | 6/1966 | Doroszlai ............... 165/40 |
| 3,512,358 | 5/1970 | Schmidt ................. 376/391 |
| 4,050,418 | 9/1977 | Watanabe ............... 165/40 |
| 4,128,123 | 12/1978 | Garriss et al. ......... 165/40 |
| 4,139,150 | 2/1979 | Graversen et al. ..... 165/40 |

FOREIGN PATENT DOCUMENTS

| | | |
|---|---|---|
| 2336146 | 2/1975 | Fed. Rep. of Germany . |
| 3228422 | 2/1984 | Fed. Rep. of Germany ...... 376/299 |
| 2334175 | 7/1977 | France . |
| 2487563 | 1/1982 | France . |

Primary Examiner—Deborah L. Kyle
Assistant Examiner—Richard W. Wendtland
Attorney, Agent, or Firm—Pollock, Vande Sande & Priddy

[57] ABSTRACT

Intrinsically safe emergency cooling device for a pressurized-water nuclear reactor, comprising an auxiliary circuit which feeds the steam generator and in which is arranged a condenser (10) receiving the steam from the generator and condensing it. The condensate is returned to the steam generator by means of gravity. The device also incorporates a passive adjustment means comprising an adjustable valve (21), a cylinder (23), the chamber of which communicates with the steam pipe (7) and contains a piston (33), and a coupling means (32) between the piston (33) and the shut-off element (30) of the valve (21). The feed rate of the steam generator and the cooling power of the condenser (10) can be regulated in this way.

4 Claims, 6 Drawing Sheets

INTRINSICALLY SAFE EMERGENCY COOLING DEVICE FOR A PRESSURIZED-WATER NUCLEAR REACTOR

FIELD OF THE INVENTION

The invention relates to an intrinsically safe emergency cooling device for a pressurized-water nuclear reactor.

BACKGROUND OF THE INVENTION

Pressurized-water nuclear reactors incorporate a primary circuit, in which the pressurized water for cooling the reactor circulates and transfers the heat of the core to the steam generators. The primary circuit usually comprises three or four loops, on each of which is arranged a steam generator which receives, on the one hand, the pressurized water and, on the other hand, the feed water which it heats and vapourizes as a result of heat exchange with the pressurized water.

In the event of an accident in the nuclear reactor, it is immediately shut-down by introducing all the control bars of the reactor into the core in their position of maximum insertion. The reactor then has to be cooled, and this can be achieved by means of the steam generators. However, the normal steam utilization and feed water recirculation circuit, which incorporates several components such as heating devices and pumps, and which therefore has a complex structure, cannot be used for the emergency cooling of the reactor after an accident. To ensure this emergency cooling, an auxiliary circuit feeding secondary water to the steam generator is therefore put into operation for each of the loops of the primary circuit incorporating a steam generator, this auxiliary circuit then taking the place of the normal steam utilization and secondary-water recirculation circuit.

So that the nuclear reactor can be cooled under all circumstances, in particular even if a source of electrical energy is no longer available on the reactor site, cooling devices comprising only passive elements have been proposed. In particular, an auxiliary feed circuit for the emergency cooling of the reactor has been proposed, and this comprises a steam condenser located at a higher level than the relatively low level of the water of the steam generator, i.e., the equivalent overall level in the form of a liquid phase, and pipelines which respectively connect the steam outlet of the generator to the inlet of the condenser and the outlet of the condenser to the feed water inlet in the steam generator.

In this auxiliary circuit, the condenser is submerged in a tank filled with water and communicating with the atmosphere, and it is cooled as a result of the boiling of the water contained in this tank, the steam generated being discharged to the atmosphere.

Such a device is therefore capable, in principle, of cooling the reactor without the need for an external energy source, the water recovered at the condenser outlet returning to the steam generator under the effect of gravity.

However, during the cooling of the primary circuit of the reactor, the operating conditions of the steam generator and the flow of steam generated vary greatly, with the result that the condenser has to operate under essentially variable conditions, but this greatly complicates the design of this condenser which, during certain cooling phases, has in any case to operate under conditions very different from its optimum operating conditions.

On the other hand, it is possible to regulate the operating conditions of the auxiliary circuit only in so far as this does not require the use of an energy source or the involvement of facilities outside the auxiliary cooling circuit.

Finally, the mass of water contained in the cooling tank of the condensers already proposed is very large, and this greatly complicates the design of the buildings in which these condensers are installed and which in any case must be capable of withstanding earthquakes.

The need to provide an intrinsically safe emergency cooling system to prevent the extremely serious consequences of operating a reactor under conditions prevailing in the event of an accident has arisen in recent years. Such an intrinsically safe system must operate without the need for an external energy source, without an operator being involved after it has been put into service, and without a regulating working fluid; it must also have available a cooling source of virtually unlimited capacity.

SUMMARY OF THE INVENTION

The object of the invention is, therefore, to propose an intrinsically safe emergency cooling device for a pressurized-water nuclear reactor incorporating a primary circuit, in which the pressurized water cooling the reactor circulates and in which at least one steam generator ensures the heating and vapourization of feed water, the cooling device comprising an auxiliary circuit which feeds the steam generator and which is put into operation in the event of an accident in the reactor and which incorporates a steam condenser located at a higher level than the relatively low level of the water of the steam generator, and pipelines which respectively connect the steam outlet of the generator to the inlet of the condenser and the outlet of the condenser to the feed-water inlet in the steam generator, this cooling device makes it possible for the condenser to operate during all the cooling phases of the nuclear reactor, up to the transfer to the cooling system at shut-down, without using an energy source or facilities outside the auxiliary feed circuit, and without the need for a pipe operator to be involved after it has been put into service.

To achieve this object, the cooling device according to the invention also incorporates a means of passive adjustment of the feed rate of the auxiliary circuit, consisting of:

an adjustable valve having a shut-off element to make it possible to open to a greater or lesser extent the valve arranged on the pipe connecting the outlet of the condenser to the inlet of the steam generator in the auxiliary circuit, a cylinder, the chamber of which contains a movable piston returned in one direction by an elastic means, in communication on one side of the piston with the pipeline connecting the steam outlet of the generator to the inlet of the condenser, and a coupling means between the piston and the shut-off element of the adjustable valve, to allow this shut-off element to be shifted in the opening direction or to be returned in the closing direction as a function of the pressure of the steam at the outlet of the steam generator.

BRIEF DESCRIPTION OF THE DRAWINGS

In order that the invention may be more clearly understood an emergency cooling device according to the invention for a pressurized-water nuclear reactor will now be described by way of example, with reference to the attached drawings.

DESCRIPTION OF PREFERRED EMBODIMENTS

Figure 1:
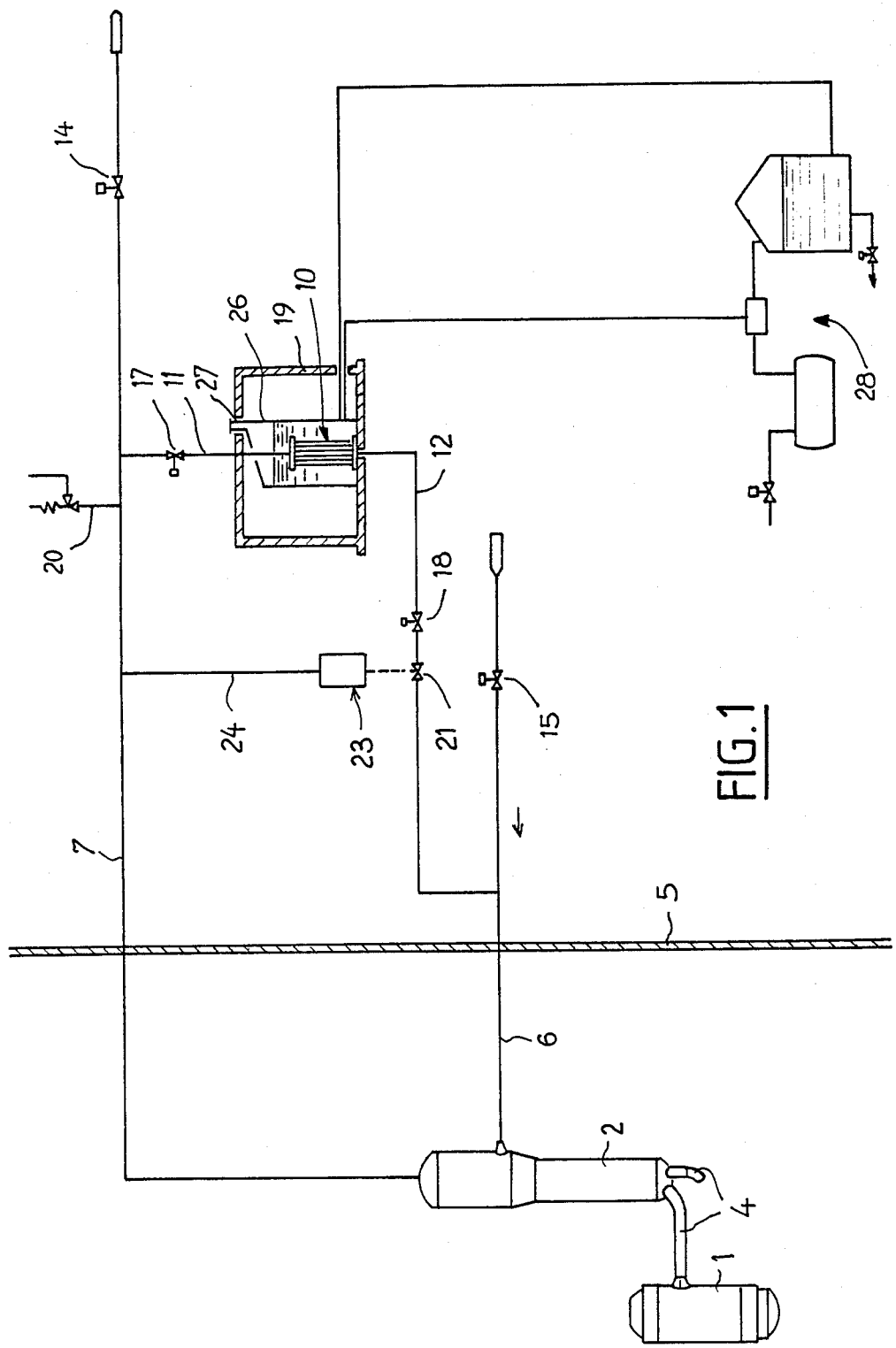
FIG. 1 is a diagrammatic view of the entire cooling device associated with one of the loops of the primary circuit of the pressurized-water nuclear reactor, where a first embodiment of the condenser is concerned.

FIG. 1 shows the vessel 1 of a pressurized-water nuclear reactor and part of a branch of the primary circuit of this reactor incorporating a steam generator 2 and the primary pipelines 4 which allow pressurized water to circulate in the steam generator. The entire primary circuit is arranged inside a containment shell, one wall 5 of which has been shown in FIG. 1. The part of FIG. 1 located on the left of the wall 5 corresponds to inside of the containment shell, and the part of FIG. 1 located on the right corresponds to the outside of this containment. The steam generator is fed with water via a pipeline 6, this feed water coming in contact, inside the steam generator 2, with the outer wall of the tubes of a tube bundle, in which the primary water circulates. The feed water is thus heated and then vapourized, and the steam, after being dried, is discharged via a pipeline 7 fastened to the upper part of the steam generator.

The pipelines 7 and 6 form part of the normal steam discharge and feed-water recirculation circuit. These pipelines pass through the wall 5 of the containment shell, in order to convey the steam to the turbines and recycle the water recovered to the condenser.

As can be seen in FIG. 1, the auxiliary circuit of the emergency cooling device incorporates part of the pipelines 6 and 7, the condenser 10 of the emergency cooling device being branched off between the pipelines 6 and 7 by means of pipelines 11 and 12.

Downstream of the junction with the pipeline 11, a shut-off valve 14 is arranged on the pipeline 7, and a shut-off valve 15 is likewise arranged on the pipeline 6 upstream of the junction with the pipeline 12, if the directions of circulation of the steam and the recycled feed water respectively are considered. The valves 14 and 15 make it possible to interrupt communication between the steam generator and the normal steam utilization and feed-water recovery circuit. The operation of closing the valves 14 and 15 is carried out immediately after a malfunction or an accident in the nuclear reactor, and the auxiliary circuit comprising the pipelines 7, 11, 6 and 12 and the condenser 10 then takes the place of the normal circuit. Shut-off valves 17 and 18 are likewise arranged on the pipelines 11 and 12 respectively. When the auxiliary circuit is in service, the valves 17 and 18 are open and the valves 14 and 15 are closed.

The steam leaving the generator 2 is in this case conveyed into the condenser 10, the condensate being recovered and returned to the steam generator via the pipeline 12. In fact, the building 19 containing the condenser 10 is located at a higher level than the relatively low level of the water in the steam generator 2, with the result that concentrate is recycled into the steam generator as a result of gravitational circulation in the pipelines 12 and 6.

However, immediately after the emergency shut-down of the reactor, when the primary circuit is still at a high temperature and the energy released is substantial, some of the steam can be discharged to the atmosphere via one (or more) valves 20 branched off from the pipeline 7.

The auxiliary circuit of the emergency cooling device also incorporates a means of passive adjustment of the feed rate of the steam generator, consisting of an adjustable valve 21 arranged on the pipeline 12 downstream of the shut-off valve 18 and a device 23 controlling this valve and connected by means of a pipe 24 to the steam line 7. This assembly will be described in more detail with reference to FIG. 2.

The condenser 10 is of a new type which forms the subject of a patent application filed on the same day as the present application. This condenser comprises an assembly of tubes immersed in the cooling water contained in the tank 26, the upper part of which is connected to a chimney 27. The water in the tank 26 comes to the boil when in contact with the tubes of the condenser receiving the steam from the generator 2, and the steam formed in the tank 26 is discharged through the chimney 27. An assembly 28 which will be described in more detail with reference to FIG. 3 makes it possible to supply the tank 26 with further cooling water.

Figure 2:
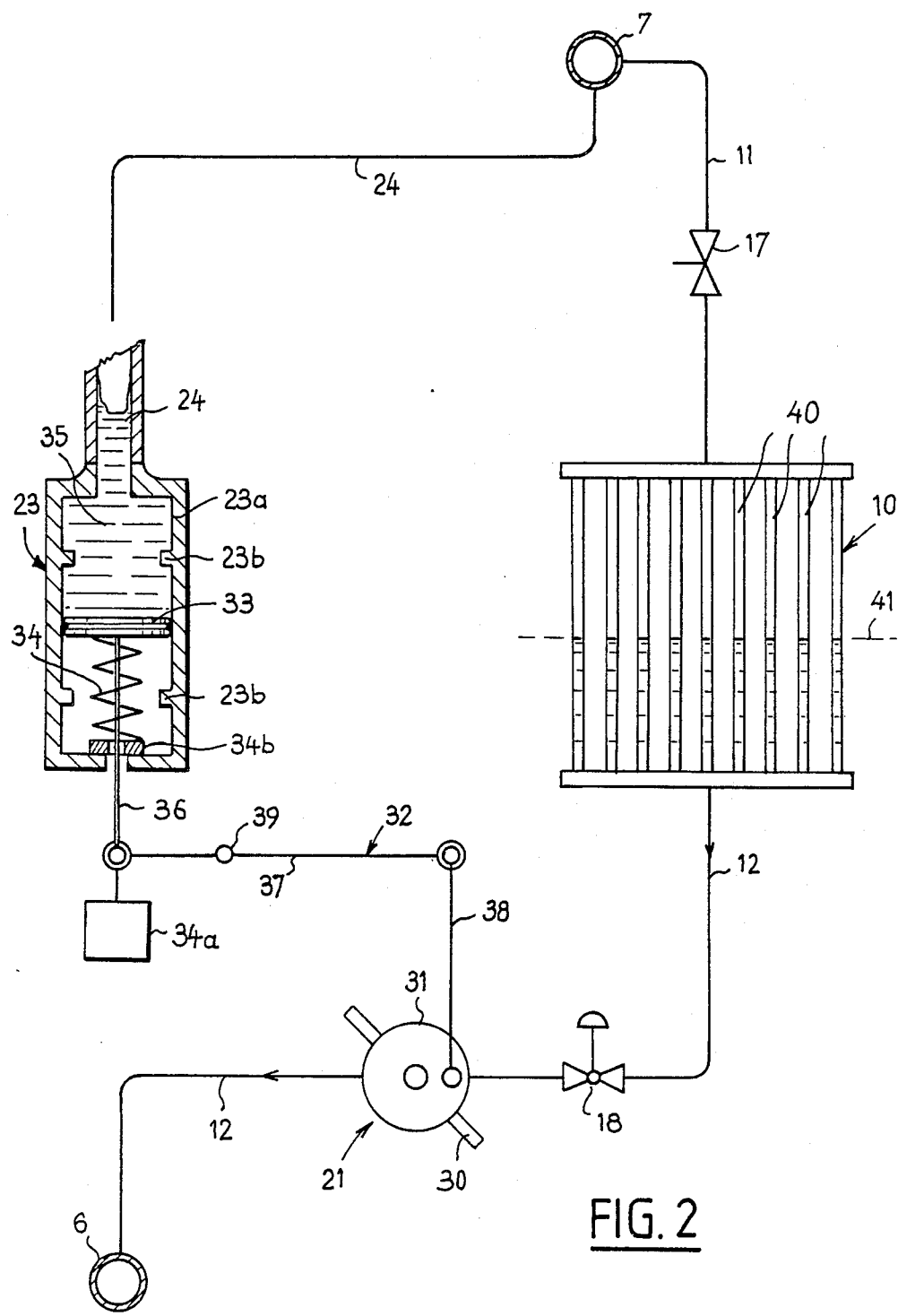
FIG. 2 is a basic diagram of the means of adjusting the feed rate in the auxiliary emergency circuit.

In FIG. 2, the passive means of adjusting the feed rate in the auxiliary circuit have been shown in more detail.

The shut-off element 30 and the actuating wheel 31 of the valve 21, the control device 23 and the coupling means 32 between the device 23 and the element 30 have been shown on a very large scale in this diagrammatic view. The control device 23 consists of a cylinder, the chamber 23a of which contains a piston 33 mounted so as to be sealed and movable between two stops 23b machined on the inner surface of the chamber 23a. This chamber is put in communication, on one side of the piston 33, with the steam line 7 by means of the pipeline 24. The pressure of the steam in the pipeline 7 is exerted on the piston 33 which is returned by a spring 34 bearing on the end of the cylinder 23 and associated with a correcting element 34a which makes it possible to ensure the stability of the control loop. A means 34b of calibrating the spring 34 is also associated with this spring. Such a calibrating means 34b can consist, for example, of a screw/nut system which makes it possible to carry out adjustable precompression of the spring 34. The steam penetrating into the pipeline 24 and transmitting the pressure to the piston 33 tends to condense at the end of the pipeline 24 and in the chamber 23a of the device 23. The pressure is therefore in fact transmitted by means of the condensation water 35.

The coupling means 32 between the piston 33 and the valve wheel 31 integral with the shutter 30 consists of an articulated assembly of three rods 36, 37 and 38, the middle rod 37 being articulated on a fixed shaft 39. The displacements of the piston 33, integral with the rod 36, inside the chamber 23a are transmitted to the valve wheel 31 by means of the device 32, so that the shutter 30 of this valve rotates in the valve opening direction, when the piston 33 is displaced by the pressurized steam, and in the closing direction when the piston 33 is displaced by the restoring spring 34 associated with the element 34a, the latter ensuring the damping necessary for control stability.

The valve opens to an extent which is the greater, the higher the steam pressure at the outlet of the steam generator 2. In FIG. 2, the device has been shown in a position corresponding to an intermediate steam pressure below the pressure reached when the piston is put into operation. The flow of condensate in the pipeline 12, running off as a result of gravity into the pipeline 6 and the steam generator 2, corresponds exactly to the flow of steam penetrating into the tubes 40 of the condenser 10. The interface between the steam and condensate in the tubes 40 occurs at a certain level 41. This level varies if the quantity of condensate formed in the condenser or the discharge rate of this condensate vary independently of one another. For constant values of the thermodynamic characteristics of the steam, the condenser cooling heat is substantially proportional to the length of the tubes which is not filled with condensate, since most of the heat is eliminated as a result of condensation of the steam and only a very small proportion as a result of the cooling of the condensate.

The condenser cooling heat is synchronized, by means of the steam pressure, with that generated by the steam generator, and this generated heat decreases very sharply from the emergency shut-down of the reactor up to the change-over to the refrigeration system at shut-down.

The steam pressure acts by means of the piston 33 on the opening of the valve 21 which regulates the discharge rate of the condensate, thus adjusting the level 41 of the interface between the steam and condensate.

In the event that the heat generated by the steam generator increases, the result is a substantially proportional increase in the steam flow produced by the generator. But the condensed steam flow depends solely on the thermodynamic characteristics of this steam and on the length of the tubes 40 which is not filled with condensate and not on the steam flow produced by the generator. Since the excess steam flow cannot be condensed immediately, this results in an increase in the steam pressure.

The adjustable valve 21 tends to open and the flow rate can increase in the auxiliary circuit. The level 41 drops, thus increasing the inner surface of the tubes 40 allowing the steam to condense. The condensed steam flow increases, thereby making it possible to synchronize the condenser cooling heat with the heat generated by the steam generator.

If the heat discharged by the steam generator decreases, actions in reverse result in a reduction in flow in the auxiliary circuit and in a rise of the level 41.

In actual fact, the thermodynamic parameters of the steam (pressure and temperature) do not remain constant during the cooling of the reactor after an emergency shut-down. The steam, which is at 300° C. and $86.10^5$ Pa at the moment of the emergency shut-down, is at a temperature of 157.5° and a pressure of $5.8.10^5$ Pa at the moment when the reactor shut-down cooling device is put into operation. This results in a substantial variation in the exchange conditions in the condenser, and this in itself has a regulating effect. In fact, the heat-exchange conditions are much more favorable when the steam is at a high temperature and a high pressure, i.e., when the power discharged by the steam generator is high.

The residual heat released by the reactor decreases sharply during the operation of the auxiliary system with condenser. Since the cooling rate of the reactor is substantially constant, the heat generated by the steam generator likewise decreases sharply from the emergency shut-down to the change-over to the shut-down refrigeration system. This results in a continuous and substantial reduction in the flow in the auxiliary circuit.

However, the pressure and temperature of the steam decrease because of the cooling of the reactor. The deterioration in the heat-exchange conditions predominates to an increasing extent, and the condenser is progressively used as near as possible to its optimum characteristics, i.e., the tubes 40 are increasingly devoid of condensate, and because of this the condenser 10 is designed so that it is capable of discharging the power in the final phase of cooling (steam at 157.5° C.) with the tubes 40 empty of condensate and condensing the steam over their entire length.

During the cooling of the reactor by means of the auxiliary system, the flow rate and the level 41 of the water/steam interface decrease simultaneously. The lowering of the level 41 causes a reduction in the circulation driving force of the condensed steam flow, and this in itself constitutes an additional regulating effect.

The spring calibration means 34b makes it possible to adjust the cooling rate of the reactor. In fact, when, for a given pressure of the steam at the outlet of the steam generator, the valve shutter 30 is in such a position that the flow of condensation water allows only the residual heat of the reactor and the heat released by the primary pump or pumps to be eliminated, the reactor cooling rate is zero. By means of this calibration of the spring, the spring can be relaxed, thus allowing a greater flow of condensation water to pass through, consequently permitting a greater extraction of power. The cooling of the reactor is thus achieved.

Conversely, when the spring is recompressed from the position allowing the reactor temperature to be maintained, the reactor can be heated for a flow of condensation water below the value which ensures that the residual heat and the heat released by the primary pumps are eliminated.

The device 23 therefore constitutes a control system which makes it possible to regulate the cooling rate of the reactor. The nominal value is introduced as a result of the calibration of the spring 34. However, the relation linking the pressure drop coefficient of the valve 21 to the opening angle of the shutter 30 and the relation linking the heat eliminated by the condenser and the condensation flow are not absolutely linear; as a result, the nominal cooling value introduced by the operator by means of the calibration of the spring 34 is only approximate. However, it is possible for him to alter the calibration of the spring 34 in order to adjust the reactor cooling rate during the operation of the auxiliary condenser circuit.

The calibration of the spring has to be modified periodically during the normal operation of the reactor, to take into account the fact that the depletion of the fuel causes an increase in the residual heat, especially during the first cycle of the fuel (a new core) when this increase is substantial.

The adjustment device operating without any external energy source therefore makes it possible to achieve self-regulated and stable operation of the auxiliary cooling circuit.

When the operating schedules for the reactor prevent the reactor from being cooled immediately after an accident, during the operations of treating the primary cooling fluid with boric acid, the cooling device according to the invention can be adapted to these operating conditions. For this purpose, the control device 23 can be uncoupled from the valve 21 during the borication operations and recoupled at the end of these operations. It is also possible, by means of the calibration of the spring, to enter a zero cooling value during the entire period of the borication operations and then to introduce a nominal value for effective cooling after these operations.

Figure 3:
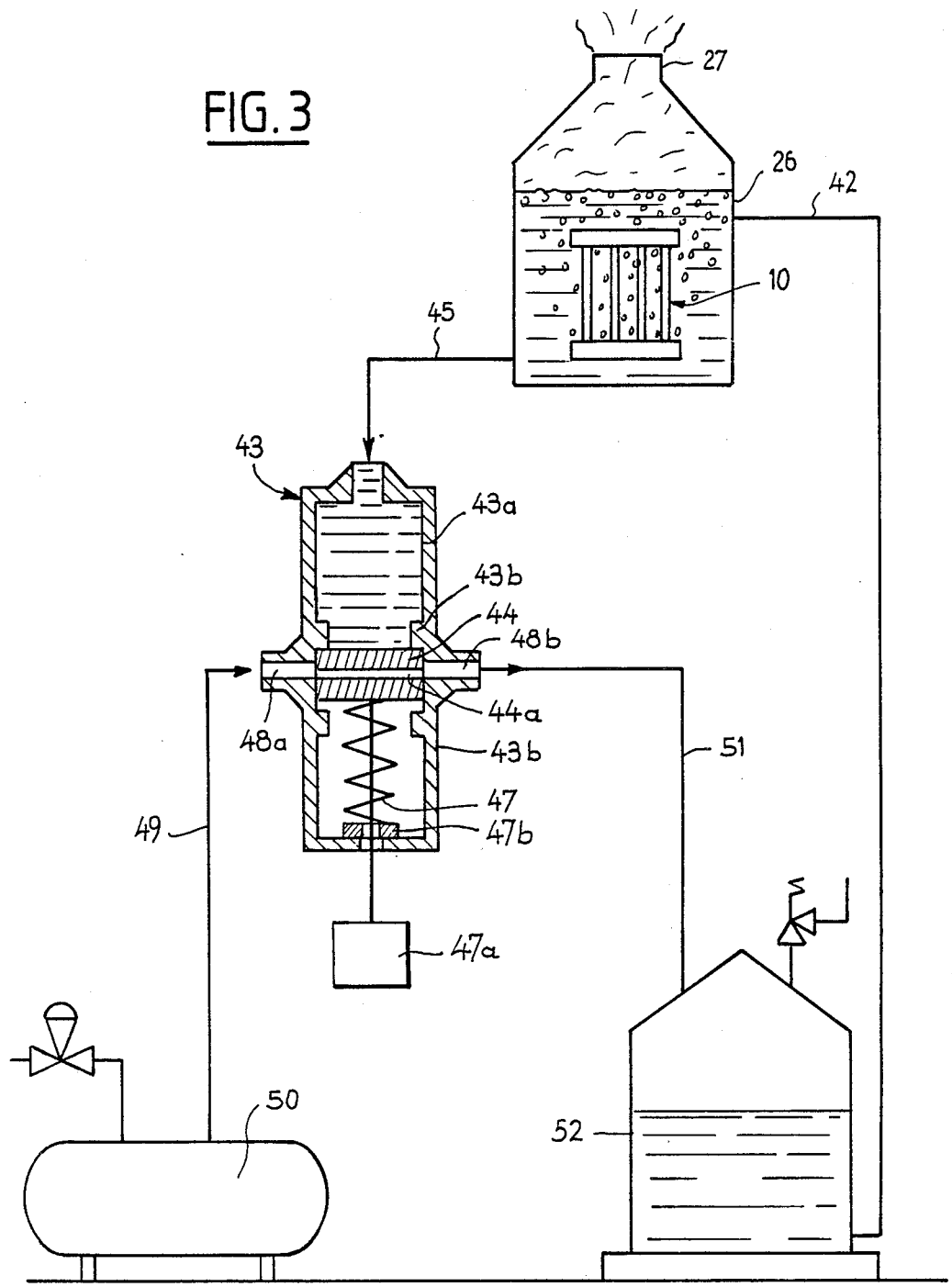
FIG. 3 is a basic diagram of the adjustment means making it possible to maintain a fixed level of cooling water in the condenser, where the first embodiment of this condenser is concerned.

Referring to FIG. 3, it will be seen that the condensation heat in the condenser 10 is absorbed as a result of the heating and boiling of the water filling the tank 26. The steam generated escapes through the chimney 27, and make-up water is supplied to the tank 26 via a feed line 42. A constant level of cooling water in the tank 26 is maintained by means of an adjustment device consisting of a cylinder 43, the chamber 43a of which contains a piston 44 mounted so as to be sealed and movable between stops 43b. The chamber 43a is connected, on one side of the piston 44, to the lower part of the tank 26 by means of a pipeline 45. The piston 44 is returned to its upper position counter to the action of the water pressure in the tank 26 by means of a spring 47 bearing on the bottom of the cylinder 43. A correcting element 47a associated with the spring 47 makes it possible to ensure the stability of the adjustment device. A calibration means 47b is likewise associated with the spring 47. The piston 44 is perforated completely through by a channel 44a which, as shown in FIG. 3, can be an extension of an inlet channel 48a and an outlet channel 48b passing through the wall of the cylinder 43. The channel 48a is connected by means of a pipeline 49 to a tank containing high-pressure compressed gas 50. The channel 48b is connected by means of a pipeline 51 to the upper part of a make-up water tank 52 containing blanket gas. When the level of the cooling water in the tank 26 of the condenser 10 is above a nominal value, the pressure of water in the lower part of this tank, transmitted to the adjustment device 43 via the pipe 45, keeps the piston 44 in the low position counter to the action of the spring 47. In this position, the channel 44a is no longer an extension of the channels 48a and 48b. The piston 44 ensures that the pipelines 49 and 51 are shut off. When the level in the tank 26 drops below a nominal value as a result of the formation of steam eliminated via the chimney 27, the pressure decreases in the chamber 43a of the cylinder 43 above the piston 44, and as a result of the action of the spring 47 the piston rises into the position shown in FIG. 3. Under the effect of the pressure difference, compressed gas from the tank 50 flows into the upper part of the make-up water tank 52, thus making it possible to supply make-up water to the tank 26 via the pipeline 42, to the moment when the level in the tank 26 has returned to above the minimum level selected as the nominal value. The pipelines 49 and 51 and the channel 44a passing through the piston 44 have a diameter which is suitable for allowing a sufficient flow to pass through, to compensate for the vapourization in the tank 26 of the condenser in all the operating phases. This device for automatically supplying further cooling water to the condenser 10 makes it possible to limit the mass of water contained in the tank 26 located at a level higher than the relatively low level of the water of the steam generator.

The calibration of the spring 47 fixed by the means 47b makes it possible to maintain the level in the tank 26 as constant as possible during the operation of the condenser 10. When the condenser 10 is in operation the tank 26 contains a two-phase water/steam mixture, of which the mass per unit volume is less than the mass per unit volume of the cold water filling the tank 26 before the condenser is put into operation. Consequently, the adjustment which is made by means of the device 43 and which is a function of pressure in the lower part of the tank 26, makes it possible to maintain the mass of water in the tank 26 constant during all the operating phases of the condenser, until it is shut off. The level of water in the tank 26 changes from a high level during the operation of the condenser to a lower level when this condenser is shut off.

Figure 4:
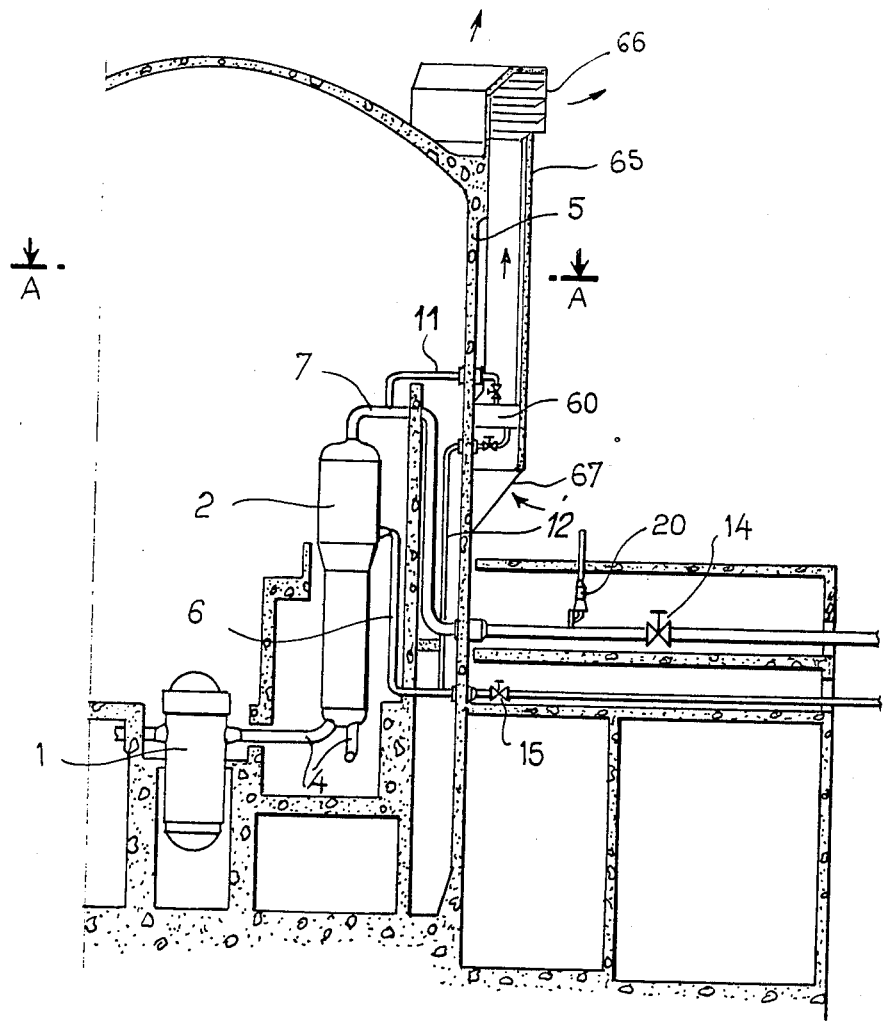
FIG. 4 is a diagrammatic view of the cooling device, where a second embodiment of the condenser in the form of aero-condensers is concerned.
Figure 5:
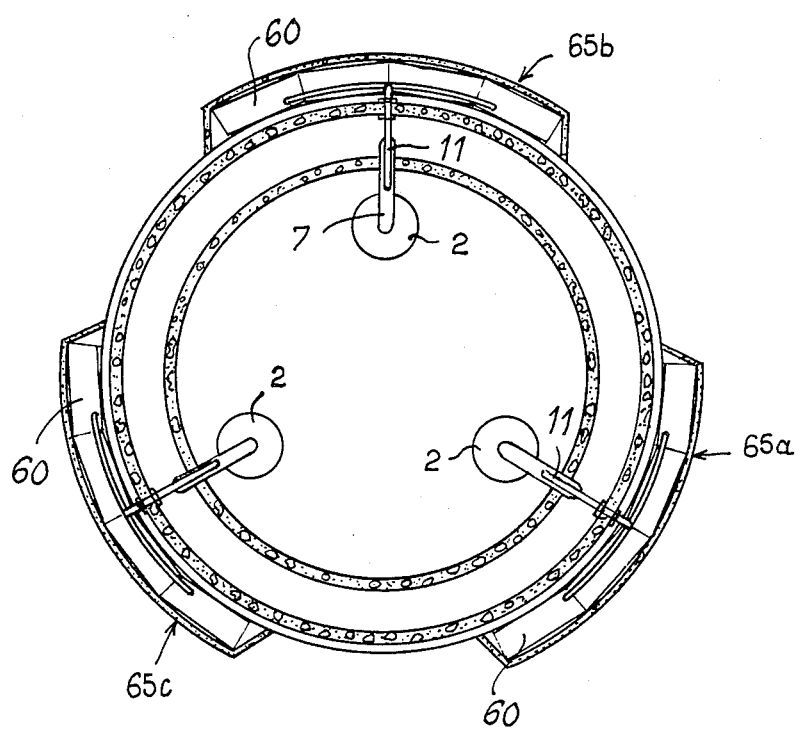
FIG. 5 is a sectional view along line A—A in FIG. 4, showing the arrangement of the aero-condensers round the containment shell of the nuclear reactor.

FIGS. 4 and 5 show a second embodiment of the condenser which, where a nuclear reactor having three loops and therefore incorporating three steam generators 2 is concerned, consists of three aero-condensation assemblies arranged in casings 65a, 65b and 65c distributed round the containment shell 5 of the reactor. The elements of the reactor and of the cooling circuit shown in FIG. 1 and in FIGS. 4 and 5 and corresponding to one another bear the same reference symbols. Each of the steam generators 2 is connected, by means of pipes 11 and 12 branching off between the pipes 6 and 7 of the feed-water and steam circuit, to the cooling elements 60 of an aero-condenser incorporating a casing 65 in the form of a portion of a cylinder, which is coaxial relative to the containment shell 5 of the reactor and which is fastened to the cylindrical surface of the latter by means of vertical webs making it possible to absorb the forces exerted by the casing 65 and the cooling elements 60 via the containment shell 5. The casing of the aerocondenser is open in its lower part 67 and constitutes a chimney having an upper part 66 provided with guide elements, so that the atmospheric air passes through the casing from the bottom upwards in natural circulation. Each casing 65 contains cooling elements 60. As before (although not shown), a device for adjusting the flow of feed water is associated with each of the aero-condensers. This adjustment device is actuated by the pressurized steam at the outlet of the steam generator and acts by means of a valve arranged on the pipe 12 returning the feed water to the steam generator.

This arrangement of the air-condensers round the containment shell of the reactor makes it possible to design and produce the condenser so that it is as efficient as possible. On the other hand, the advantage of an aero-condenser is that it operates with a source of cooling fluid of infinite capacity.

Figure 6:
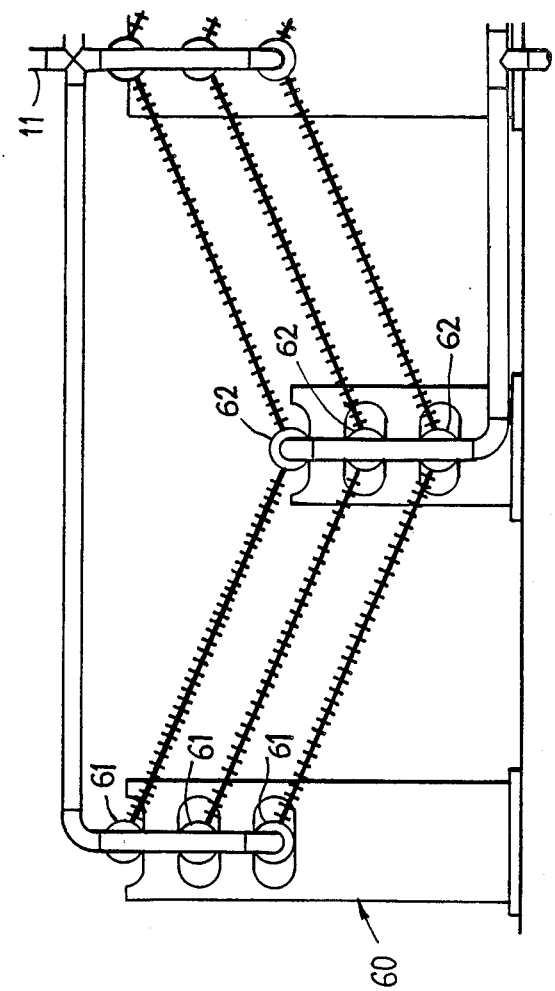
FIG. 6 is an elevation view of part of an aero condenser.
Figure 7:
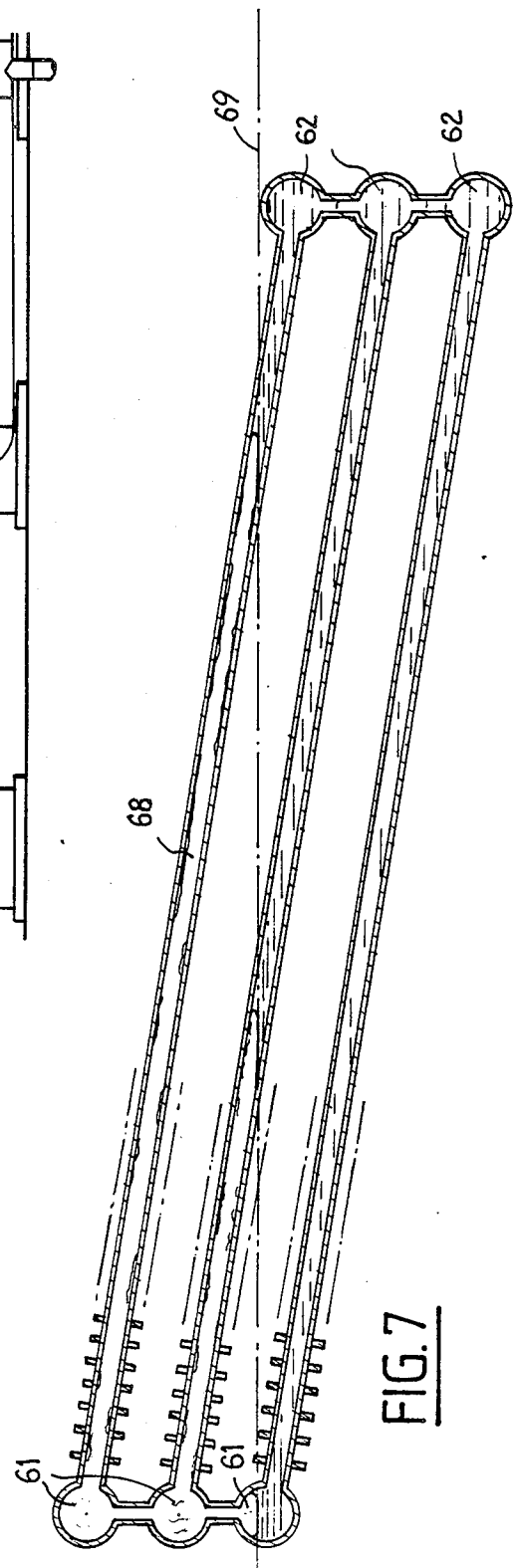
FIG. 7 is a sectional view of one of the component elements of the aero-condenser illustrated in FIG. 4, showing the positions of equilibrium of the steam and condensate, in an intermediate cooling phase.

In FIGS. 6 and 7, it can be seen that the cooling elements 60 are made in the form of finned tubes 68 which are inclined relative to the horizontal plane and which are connected at one of their ends to steam collectors 61 and at their other end to condensate collectors 62. The tubes 68 can be connected to the collectors so as to constitute successive assemblies of parallel tubes of any number. These assemblies of tubes 60 are arranged in the aero-condenser casing 65 which constitutes a cooling-air circulation chimney ensuring condensation inside the tubes 68.

FIG. 7 shows a modular assembly of three tubes 68 communicating with one another by means of steam collectors 61 and condensate collectors 62 located at their ends. It emerges that, in the same way as in a condenser with submerged vertical tubes, such as that shown in FIG. 2, the separating meniscus between the steam and condensate forms at a certain level 69 for a certain extraction of power in the condenser. If the condenser 10 shown in FIG. 2 is replaced by an aero-condenser, such as that shown in FIGS. 4 to 7, the device adjusting the flow of condensate 23 makes it possible to maintain the level 69 in a fixed position for a constant power extracted by the steam generator. When the power increases, the flow of condensate increases, and as before the level 69 drops, thus increasing the length of the tubes ensuring condensation and therefore extraction of power by means of the condenser.

Where both a condenser with tubes submerged in the cooling water and an aero condenser are concerned, self-regulation of the operation of the reactor cooling device is therefore achieved. This self-regulation is obtained in a very simple way by adjusting the condensate draw-off rate at the condenser 10 as a function of the steam pressure at the outlet of the steam generator.

The invention is not limited to the embodiment which has been described. Thus, the condenser can be of a different type from those envisaged, from the moment when the regulation of the flow of condensate as a function of the steam pressure at the outlet of the steam generator makes it possible to adjust the cooling power of the condenser.

It is possible to utilize other embodiments of the passive means of adjusting the auxiliary feed rate, i.e., the flow of condensate, and in particular other coupling means between the piston and the shut-off element of the regulating valve. It is also possible to use other elastic piston-return means, for example a volume of gas trapped between the face of the piston opposite the face exposed to the steam and the bottom of the cylinder.

The cooling device according to the invention can be used in any nuclear reactor, whatever the number of loops in the primary circuit, an auxiliary steam-generator supply circuit and a condenser being associated with each of the loops on which there is a steam generator.

We claim:

1. In a pressurized-water nuclear reactor incorporating a primary circuit, in which the pressurized cooling water of the reactor circulates and, in at least one steam generator, ensures the heating and vaporization of feed water, a self-regulating emergency cooling device comprising an auxiliary circuit which feeds the steam generator and is put into operation in the event of an accident in the reactor and which incorporates a steam condenser located at a higher level than a relatively low level of the water of the steam generator, and pipelines which respectively connect the steam outlet of the generator to the inlet of the condenser and the outlet of the condenser to the feed water inlet in the steam generator, wherein the condenser incorporates tubes submerged in water which is contained in a tank and the heating and boiling of which ensure the cooling of the tubes of the condenser, and the cooling device further comprises a passive means of adjusting the flow in the auxiliary feed circuit, consisting of:

(a) an adjustable valve having a shut-off element to make it possible to open to a varying extent the valve arranged on the pipe connecting the outlet of the condenser to the inlet of the steam generator in the auxiliary circuit;

(b) a cylinder, a chamber of which contains a movable piston returned by an elastic means and which communicates on one side of the piston with the pipeline connecting the steam outlet of the steam generator to the inlet of the condenser; and (c) a coupling means between the piston and the shut-off element of the adjustable valve, to allow this shut-off element to be shifted selectively in the opening direction and closing direction as a function of the steam pressure at the outlet of the steam generator.

2. Cooling device according to claim 1, wherein the condenser incorporates tubes inside which condensation takes place and which are inclined relative to a horizontal plane, and of which a part located at the lowest level communicates with the pipeline connecting the outlet of the condenser to the inlet of the steam generator, the level of the condensate in these tubes being in a vertical position dependent on the flow in the auxiliary feed circuit and on the thermodynamic characteristics of the steam at the outlet of the steam generator.

3. Cooling device according to claim 2, wherein the tubes of the condenser are arranged vertically.

4. Cooling device according to claim 1, wherein the tank is connected to a cooling-water supply pipe connected at its other end to a make-up tank, the upper part of which communicates by means of a regulating device with a compressed-gas tank, the regulating device consisting of a cylinder, the chamber of which contains a piston, one side of which is subjected to the pressure of the water in the lower part of the tank and which is associated with an elastic restoring means, the piston being perforated with a channel which puts in communication the compressed-air tank and the upper part of the make-up water tank when the level of the cooling water in the tank is below a nominal value.

* * * * *